United States Patent
Zordan

(10) Patent No.: US 7,367,892 B2
(45) Date of Patent: May 6, 2008

(54) ACTUATOR WITH TORQUE LIMITER

(75) Inventor: Cedric Zordan, Paris (FR)

(73) Assignee: Messier-Bugatti, Velizy Villacoublay (FR)

( * ) Notice: Subject to any disclaimer, the term of this patent is extended or adjusted under 35 U.S.C. 154(b) by 148 days.

(21) Appl. No.: 10/515,924

(22) PCT Filed: May 28, 2003

(86) PCT No.: PCT/FR03/01621

§ 371 (c)(1),
(2), (4) Date: Jul. 13, 2005

(87) PCT Pub. No.: WO03/102436

PCT Pub. Date: Dec. 11, 2003

(65) Prior Publication Data

US 2006/0166746 A1 Jul. 27, 2006

(30) Foreign Application Priority Data

May 31, 2002 (FR) .................................. 02 06742

(51) Int. Cl.
*F16D 7/02* (2006.01)
(52) U.S. Cl. ........................................................ 464/46
(58) Field of Classification Search ................. 464/30, 464/43–48; 192/56.6; 244/102 R, 102 A
See application file for complete search history.

(56) References Cited

U.S. PATENT DOCUMENTS

| 2,140,723 A | * | 12/1938 | Spicer ................... 192/56.6 X |
| 2,675,835 A | * | 4/1954 | Kiekhaefer ............... 464/46 X |
| 2,709,349 A | | 5/1955 | Kuehn |
| 2,862,376 A | * | 12/1958 | Thelander .................... 464/46 |
| 3,157,978 A | * | 11/1964 | McMullen ................ 464/45 X |
| 3,807,249 A | * | 4/1974 | Cheek et al. |
| 4,542,812 A | | 9/1985 | Westly |
| 4,624,650 A | * | 11/1986 | Hiruma et al. ............ 464/46 X |

FOREIGN PATENT DOCUMENTS

| DE | 11 46 762 | 4/1963 |
| DE | 25 32 987 | 2/1977 |

* cited by examiner

*Primary Examiner*—Greg Binda
(74) *Attorney, Agent, or Firm*—Young & Thompson

(57) ABSTRACT

An actuator includes: at least one drive motor; an outlet (22); an adjustable torque limiter which is disposed between the/each motor and the outlet (22), the torque limiter having a mobile element (100) which is used to set the maximum torque transmitted; and a case which houses the motor and the torque limiter. The case is provided with an opening (110) for accessing the mobile element (100) used to set the maximum torque transmitted and the torque limiter is mounted in the case.

8 Claims, 5 Drawing Sheets

ACTUATOR WITH TORQUE LIMITER

FIELD OF THE INVENTION

The present invention relates to an actuator of the type comprising:

at least one drive motor;

an output member;

an adjustable torque limiter which is interposed between the or each motor and the output member, the torque limiter comprising a movable member for adjusting a maximum transmitted torque; and a housing which contains the or each motor and the torque limiter.

BACKGROUND OF THE INVENTION

In a number of fields, it is necessary for actuators to be provided with a torque limiter. This torque limiter is constituted, for example, by friction members which are held compressed together, the compression force of these friction members defining the sliding torque between these two members. The torque transmitted is limited to the sliding torque.

In practice, it is advantageous for the torque limiter to be calibrated before assembly. In an actuator, the torque limiter is generally preceded and/or followed by other reduction gear members, such as an epicyclic reduction gear, or reduction steps which are provided between the drive motor(s) and the torque limiter.

Owing to the machining differences between the various components which can be used from one actuator to another, it is difficult to determine by means of calculation the calibration of the torque limiter in accordance with the other elements of the actuator in order to ensure a maximum predetermined torque at the output member of the actuator.

SUMMARY OF THE INVENTION

The object of the invention is to provide an actuator which allows the limit torque measured at the output member to be fixed in a precise manner, independently of the production quality of the various members which are present in the kinematic chain between the drive motor(s) of the actuator and the output member.

To this end, the subject-matter of the invention is an actuator of the above-mentioned type, characterised in that the housing has an opening for access to the movable member for adjusting the maximum torque transmitted whilst the torque limiter is mounted in the housing.

According to specific embodiments, the actuator further comprises one or more of the following features:

the adjusting member comprises a nut and the torque limiter comprises a shaft having a threaded portion, the nut is screwed on the threaded portion, the axial position of the nut on the threaded portion defining the maximum torque transmitted, and the actuator comprises corresponding recesses which are provided in the shaft and in the nut, as well as a member for fixing the nut on the shaft, which member is engaged in the corresponding recesses, in the direction of the shaft;

the fixing member comprises a support which is arranged at the end of the shaft, which support carries at least one locking finger which is engaged in two corresponding recesses;

it comprises a screw for retaining the fixing member, which screw is engaged in a threaded hole which is provided in the shaft;

it comprises a removable plug for closing the opening; and it comprises at least one reduction step between the or each motor and the output member.

BRIEF DESCRIPTION OF THE DRAWINGS

The invention will be better understood from a reading of the following description, given purely by way of example and with reference to the drawings, in which.

DETAILED DESCRIPTION OF THE PREFERRED EMBODIMENTS

Figure 1:
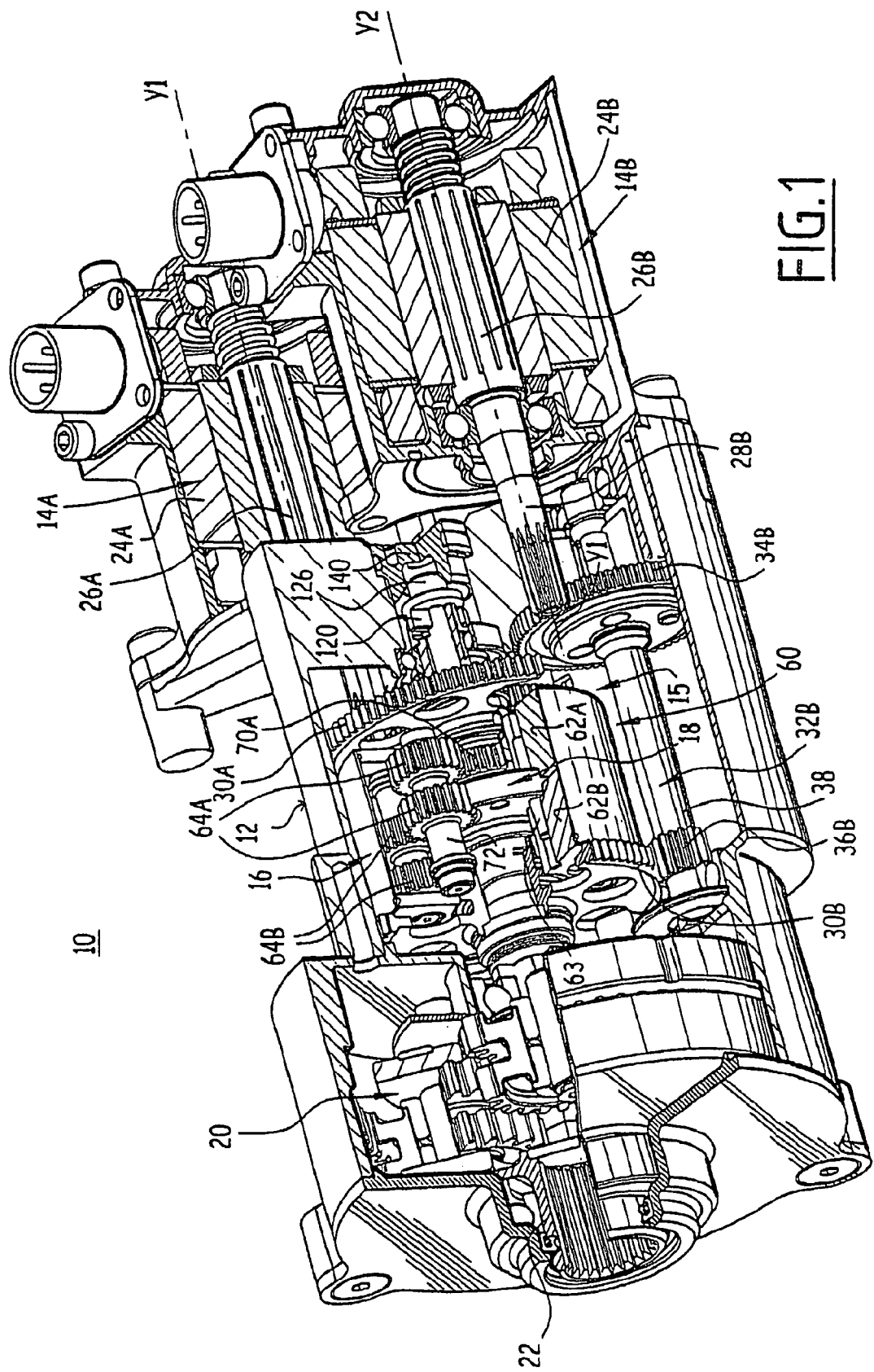
FIG. 1 is a partially cut away perspective view of an actuator according to the invention.

The actuator 10 illustrated in the Figures is intended for locking an undercarriage of an aircraft in a retracted position.

This actuator comprises a housing 12, inside which two drive motors 14A, 14B are arranged, each of which is connected mechanically to a differential reduction gear and torque limiting mechanism 15. This mechanism comprises a differential reduction gear 16 which includes a torque limiter 18. The actuator further comprises an epicyclic reduction gear 20 which is driven by the mechanism 15 and a rotating output member 22 which protrudes from the housing 12 and which is itself driven by the epicyclic reduction gear 20.

More precisely, the two motors 14A, 14B are constituted by electric motors whose stators 24A, 24B are fixedly joined to the housing 12 and whose rotors 26A, 26B can be rotatably moved about axes Y1-Y1 and Y2-Y2 which extend parallel with each other.

The output shafts 28A, 28B of the motors drive the first and second motor sun pinions 30A, 30B of the differential reduction gear 16. These motor sun pinions can rotate around the same principal axis X-X which extends parallel with the axes Y1-Y1 and Y2-Y2 of the motors.

Figure 2:
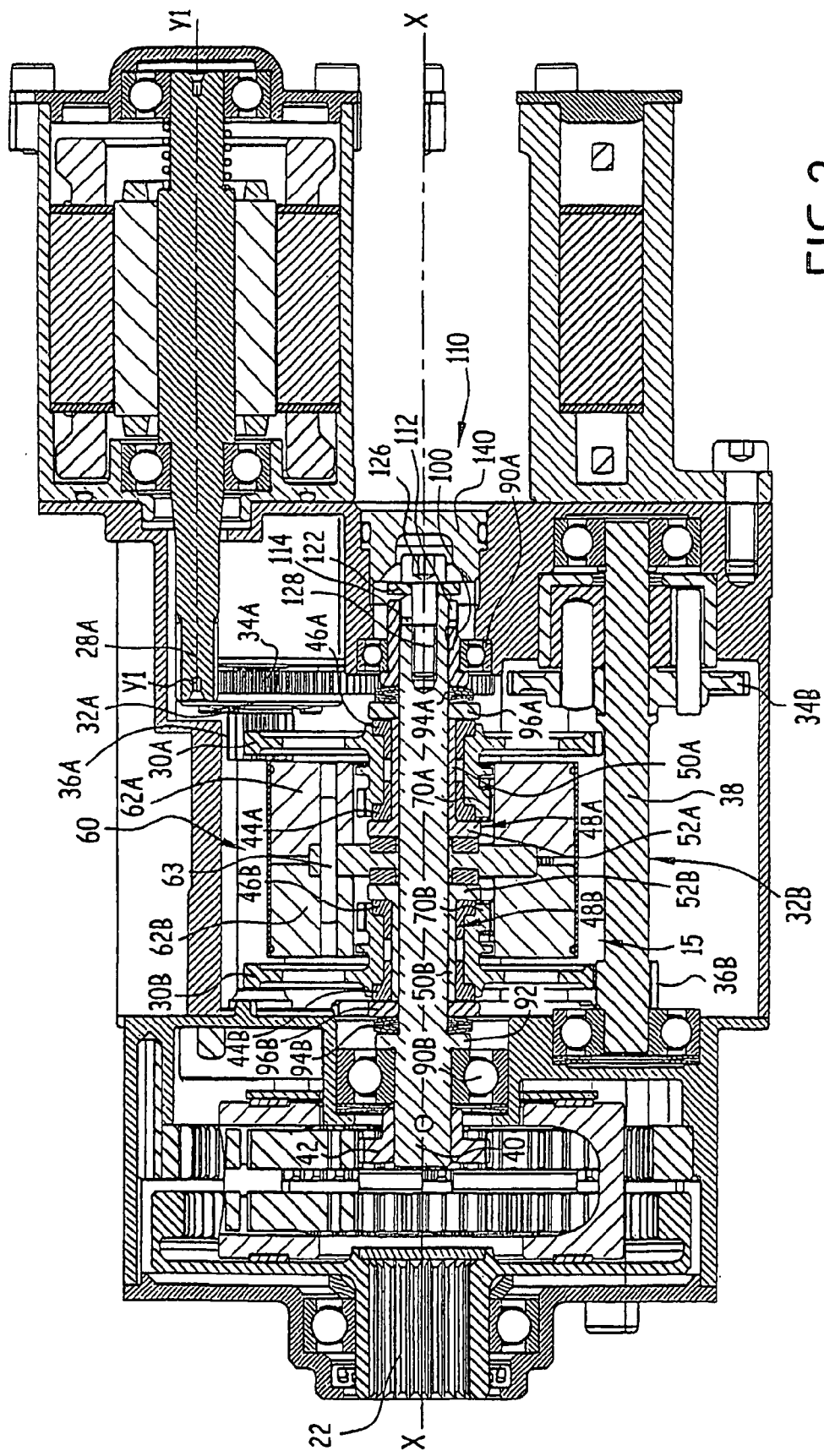
FIG. 2 is a longitudinal sectioned view of the actuator of FIG. 1.

As illustrated in FIG. 2, the output shaft 28A of the motor is coupled to the motor sun pinion 30A in order to be caused to rotate by means of a reduction step 32A which is constituted by two coaxial and fixedly joined pinions 34A, 36A which have different diameters.

Similarly, as illustrated in FIG. 1, the output shaft 28B of the motor is coupled in terms of rotation to the motor sun pinion 30B by means of a reduction step 32B which is constituted by two coaxial pinions 34B, 36B which have different diameters and which are fixedly joined by a shaft 38.

Figure 3:
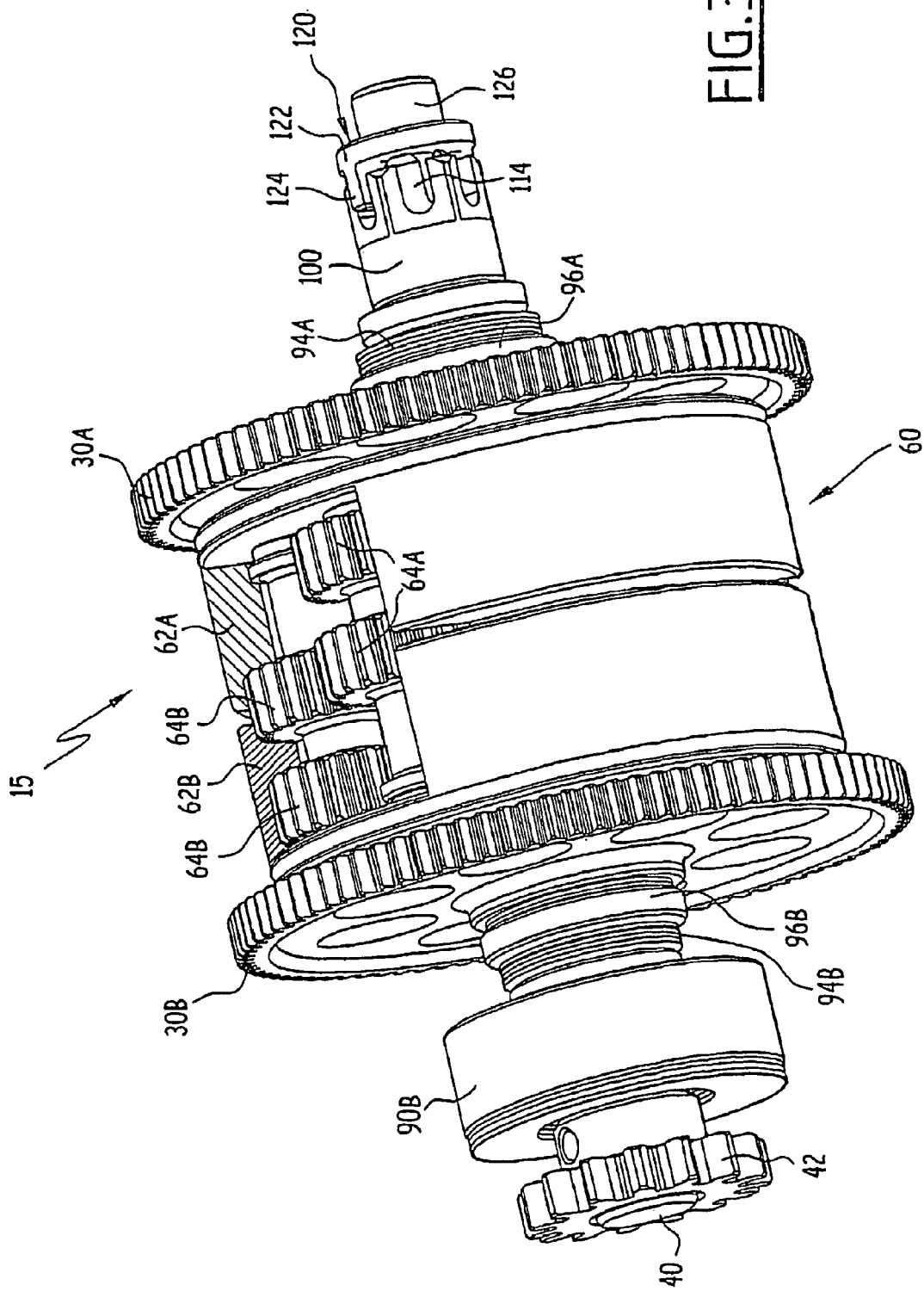
FIG. 3 is a partially cut away perspective view of the differential reduction gear and torque limiting mechanism of the actuator of FIGS. 1 and 2.
Figure 4:
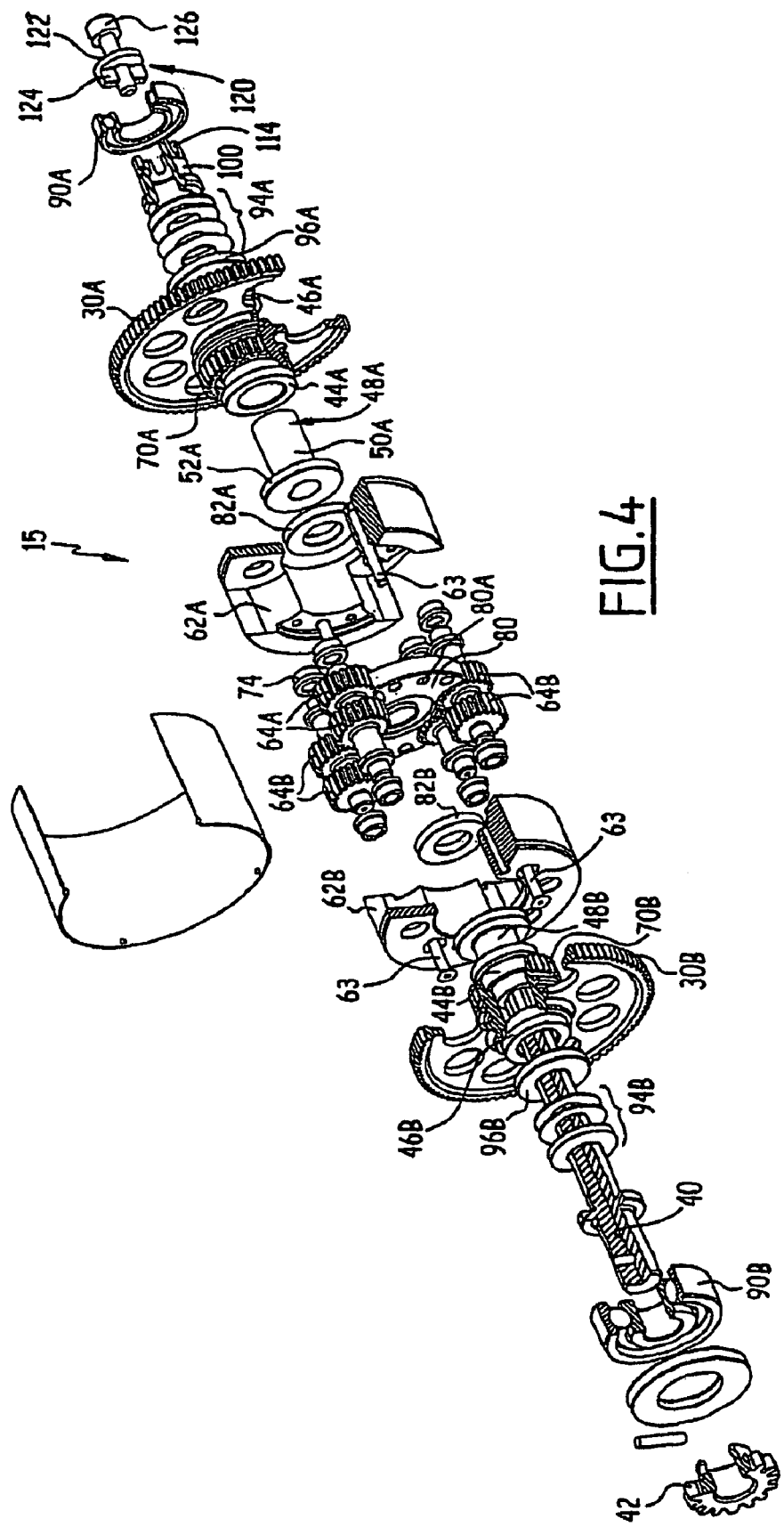
FIG. 4 is an exploded perspective view of the mechanism of FIG. 3.
Figure 5:
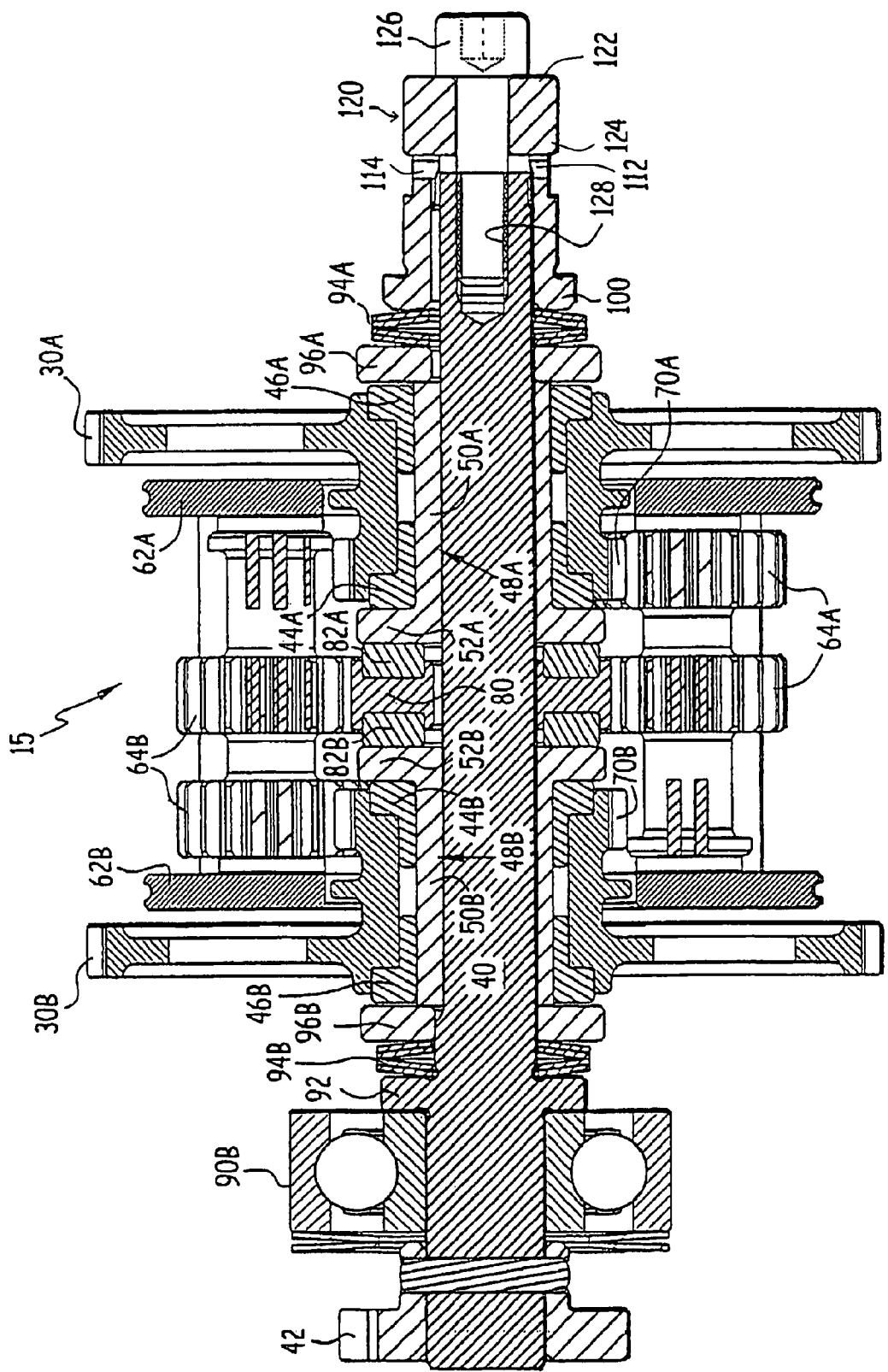
FIG. 5 is a longitudinal sectioned view of the mechanism illustrated in FIGS. 3 and 4.

The speed differential reduction and torque limiting mechanism 15 is illustrated alone in FIGS. 3 to 5. It has an output shaft 40 which extends along axis X-X. This shaft has, at a first end, an output pinion 42 which can drive the epicyclic reduction gear 20.

The two motor sun pinions 30A, 30B are mounted so as to rotate freely about the output shaft 40. The axes of the pinions 30A, 30B and the output shaft 40 are identical. The pinions 30A, 30B are supported by this shaft and are guided in rotation about the shaft by sliding bearings or rolling bearings 44A, 46A and 44B, 46B having lateral shoulders for axial retention.

Clamping jaws 48A, 48B are arranged between these bearings and the shaft 40. These jaws are constituted by sleeves 50A, 50B which are extended at the facing ends thereof by integral collars 52A, 52B. The jaws 48A, 48B are connected in terms of rotation to the shaft 40 but are free to slide in translation along the length thereof. To this end, complementary profiles, such as flat portions, are provided on the outer surface of the shaft 40 and on the inner surface of the jaws 48A, 48B.

The differential reduction gear 16 comprises, between the two motor sun pinions 30A, 30B, a planet carrier 60 which is constituted by two end-plates 62A, 62B which are fixedly joined to each other in terms of rotation by means of pins and screws 63. Between the two end-plates 62A, 62B of the planet carrier, there are mounted pairs of planet pinions 64A, 64B which engage with each other and each of which engages with a small driving sun pinion 70A, 70B which is fixedly joined to the motor sun pinion 30A and 30B, respectively.

Each planet pinion is in fact formed by two identical coaxial and integral gears which are carried by a shaft 72, with which they are integral.

The shafts 72 can rotate about themselves relative to the end-plates 62A, 62B, between which they are held by means of bearings 74. The shafts 72 extend parallel with each other and parallel with the axis X-X of the output shaft 40. The axes of the shafts 72 are different from the axis X-X so that the planet pinions 64A, 64B can rotate together as an assembly about the axis X-X.

A hub 80 is fixedly joined in terms of rotation to the planet carrier 60 by means of the pins 63. This hub is mounted so as to be able to rotate about the shaft 40. It is arranged between the two motor sun pinions 30A, 30B. The hub 80 can be seen more clearly in FIG. 4. It is of planar form with a generally annular core which is extended by two diametrically opposed lateral lugs 80A, through which the pins 63 extend. The pinions 64A, 64B are arranged around the core in the openings provided between the lateral lugs 80A.

The hub 80 comprises two friction discs 82A, 82B which are attached by means of adhesive bonding at the opposing planar surfaces thereof. They are held compressed between the collars 52A, 52B of the jaws 48A, 48B, these collars forming friction members which can co-operate with the friction discs over planar annular surfaces.

The output shaft 40 is supported by means of ball bearings 90A, 90B which are arranged at one side and the other of the mechanism 15. These ball bearings are supported by the housing 12. The shaft 40 has a collar 92 which can be axially supported on the ball bearing 90B which is axially supported on a shoulder of the housing 12.

The hub 80 is axially clamped between the two jaws 48A, 48B. The jaw 48B is supported on the collar 92 by means of a stack of Belleville washers 94B and a rigid washer 96B.

The jaw 48A is pressed by means of a rigid washer 96A and a stack of Belleville washers 94A. This stack carried by the shaft 40 is kept clamped by means of a nut 100 which is screwed and centered on the second end of the shaft 40 opposite that which presses against the pinion 42. The ball bearing 90A is engaged around this nut 100 over a length of the nut which has a smooth surface at the outer side.

In this manner, the nut 100 brings about axial retention of the hub 80 which is clamped between the two jaws 48A, 48B. The jaws are urged towards each other by the Belleville washers 94A, 94B, by means of the support washers 96A, 96B. The Belleville washers are held compressed at one side by the collar 92 and, at the other side, by the nut 100.

Depending on the tightening of the nut 100, the Belleville washers are compressed to a greater or lesser extent and the pressure which they apply to the jaws 48A, 48B can be adjusted in such a manner that the friction force between the jaws 48A, 48B and the friction discs 82A, 82B is modified.

In order to adjust the friction force, the housing 12 has an opening 110 which is provided in the extension of the output shaft 40 and which allows access to the nut 100 and allows it to be operated with a spanner. In order to bring about the fixing of the nut, the shaft 40 has, at the second end thereof which carries the nut, transverse recesses 112 which open at the end of the shaft. There are, for example, three recesses. Corresponding recesses 112, 114 are provided in the nut 100. They also open at the end of the nut.

A locking member 120 constituted by a collar 122 which carries two locking fingers 124 is engaged at the end of the shaft in such a manner that the fingers are received in corresponding radial recesses which are provided at the end of the shaft 40 and in the nut 100.

A screw 126 is engaged in a threaded hole 128 which is arranged axially at the end of the shaft. Screw 126 extends through the locking member 120 and brings about the retention of screw 126.

The opening 110 is closed by means of a removable and leak-tight protection plug 140.

The actuator operates in the following manner.

When the two motors rotate at the same speed, the two motor sun pinions 30A, 30B are driven in the same direction. In this manner, the associated planet pinions 64A, 64B of the same pair are stationary relative to each other. The planet carrier 60 is caused to rotate by the planet pinions which are themselves caused to rotate about the shaft X-X by means of the driving sun pinions 70A, 70B.

The hub 80 is then caused to rotate with the planet carrier 60.

The torque which is provided by the motors is transmitted from the hub 80 to the shaft 40, as long as the friction force applied between the clamping jaws 48A, 48B and the friction discs 82A, 82B is greater than the torque supplied by the motors.

If this torque provided by the motor is greater than the friction force applied by friction, the friction discs slide over the friction surfaces of the jaws in such a manner that only a portion of the torque is transmitted. Therefore, the hub clamped between the clamping members 48A, 48B forms a torque limiter which is interposed between the two motor sun pinions 30A, 30B.

If one of the motors rotates at a different speed relative to the other motor, or if one of the motors is stopped, the two driving sun pinions 70A, 70B rotate at different speeds so that the planet pinions 64A, 64B are caused to rotate about themselves in opposite directions, which compensates for the difference in the speed of rotation of the two motors. The planet carrier 60 is then driven at a mean speed between the speeds of the two motor sun pinions 30A, 30B, which thus drives the shaft 40 at this speed as long as the torque provided by the motors is less than the friction torque applied by the friction surfaces which are in contact.

As known per se, the shaft 40 drives the control member 22 via the epicyclic reduction gear 20.

Since the torque limiter is interposed between the two motor sun pinions 30A, 30B, the space taken up by the reduction gear and torque limiting mechanism is reduced, which allows an actuator to be produced which generally takes up a small amount of space.

In order to bring about the adjustment of the torque limiter, the plug 140 is removed, thus allowing access to the screw 126. The screw 126 is removed as well as the locking member 120. The nut 100 is screwed or unscrewed in order to bring about a suitable clamping force for the two jaws 48A, 48B on the friction discs 82A, 82B.

After the position of the nut has been adjusted, the locking member 120 is engaged once more in corresponding recesses 112, 114 of the nut and the end of the shaft, and the screw 126 is retightened in order to bring about axial retention of the locking member 120. The plug 140 is finally repositioned in order to ensure the leak-tightness of the housing.

It will thus be appreciated that, in an actuator of this type, the torque limiter can be calibrated after the actuator assembly has been assembled, thereby allowing friction and losses of efficiency caused by the various engaged elements which constitute the actuator, and in particular the pinions of the epicyclic reduction gear 20, to be taken into account. In this manner, the maximum output torque of the actuator measured in the region of the output member 22 can be defined in a precise manner regardless of the machining quality of the various moving elements of the actuator.

The invention claimed is:

1. Actuator comprising:
    at least one drive motor;
    an output member;
    an adjustable torque limiter which is interposed between the at least one motor and the output member, the torque limiter comprising a movable member for adjusting a maximum transmitted torque;
    a housing which contains the at least one motor and the torque limiter, the housing having an access opening for access to the movable member for adjusting the maximum torque transmitted whilst the torque limiter is mounted in the housing; and
    a removable plug for closing the access opening,
    wherein the movable member comprises a nut and the torque limiter comprises a shaft having first and second ends, a threaded portion being at said second end, the nut being screwed on the threaded portion, said second end and said movable member being arranged entirely inside the housing such that an axial geometric projection of the second end of the shaft extends through the access opening.

2. Actuator according to claim 1, wherein the axial position of the nut on the threaded portion defines the maximum torque transmitted, and wherein the actuator comprises corresponding recesses which are provided in the shaft and on the nut, as well as a member for fixing the nut on the shaft, said member is engaged in the corresponding recesses, in the direction of the shaft.

3. Actuator according to claim 2, wherein the
    fixing member comprises a support which is arranged at the end of the shaft, which support carries at least one locking finger which is engaged in two corresponding recesses.

4. Actuator according to claim 3, further comprising a screw for retaining the fixing member, said screw is engaged in a threaded hole which is provided in the shaft.

5. Actuator according to claim 2, wherein the screw is screwed on one end of the shaft, and the recesses of the shaft are transverse recesses which open at the end of the shaft.

6. Actuator according to claim 5, wherein the recesses of the nut open at the end of the nut.

7. Actuator according to claim 1, further comprising at least one gear reduction between the at least one motor and the output member.

8. An actuator comprising:
    two drive motors;
    an output member;
    an adjustable torque limiter which is interposed between the two driver motors and the output member, said torque limiter comprising a shaft having a threaded portion at one end;
    a nut screwed into said threaded portion, said nut adjusting the maximum transmitted torque;
    a housing which contains at least the torque limiter, said housing having an opening adjacent said one end of the shaft for access to the nut, said nut and said torque limiter being entirely within the housing; and
    a removable plug for closing said opening.

* * * * *